United States Patent Office 3,541,188
Patented Nov. 17, 1970

1

3,541,188
HOT MELT ADHESIVE
Richard E. Srail, Cuyahoga Falls, Ohio, assignor to The Goodyear Tire & Rubber Company, Akron, Ohio, a corporation of Ohio
No Drawing. Filed Sept. 18, 1967, Ser. No. 668,680
Int. Cl. C08f 29/12
U.S. Cl. 260—889                                    7 Claims

ABSTRACT OF THE DISCLOSURE

An improved hot melt adhesive composition which comprises an admixture of at least one thermoplastic polymer and a synthetic hydrocarbon resin tackifier wherein the said synthetic resin tackifier comprises from about 40 to about 80 weight percent units derived from 1,3-pentadiene from about 60 to about 20 weight percent units derived from 2-methyl-2-butene.

---

This invention relates to novel hot melt adhesive compositions. More particularly, this invention relates to hot melt adhesive compositions which comprise mixtures of synthetic hydrocarbon resin tackifiers and polymeric materials.

Hot melt adhesives are a class of adhesive compositions which are useful in many industrial applications. The hot melt adhesives are sometimes called hot melts and generally are solid or semi-solid mixtures of various resins, including tackifying resins, polymeric materials including thermoplastic and rubbery polymers, waxes, plasticizers, pigments and other additives. Hot melt adhesive bonds are advantageously obtained by melting the hot melt to a flowable tacky molten state, applying it to a substrate, adhering another surface over the hot melt coating, and cooling the hot melt to a temperature below its melting point to form an adhesive bond between the substrates.

In many applications of hot melt adhesives it is desired that the hot melt adhesives have good color and thermal stability and do not degrade at their elevated temperature of application.

Therefore it is an object of this invention to provide a hot melt adhesive having an improved stability at its elevated temperature of application.

In accordance with this invention it has been found unexpectedly that an improved hot melt adhesive composition comprises an admixture of at least one rubbery or thermoplastic polymer and a synthetic hydrocarbon resin tackifier wherein the said synthetic resin tackifier comprises from about 40 to about 80 weight percent units derived from 1,3-pentadiene from about 60 to about 20 weight percent units derived from 2-methyl-2-butene.

The synthetic tackifying resins used in this invention are characterized by having a softening point of from about 80° C. to about 110° C. according to ASTM Method E28–58T. They usually have a specific gravity of from about .85 to about 1.0. The resin can be treated, by steam stripping, for example, to remove lower molecular weight compounds and thus increase their softening point to a range of from about 90° C. to about 110° C. These resins are generally soluble in aromatic hydrocarbons such as benzene and toluene.

The tackifying resins are further characterized by having a composition comprising from about 40 to about 80 weight percent units derived from piperylene, correspondingly from about 60 to about 20 weight percent units derived from 2-methyl-2-butene and, when modified as hereinafter described, can contain up to about 25 weight percent units derived from piperylene dimers, piperylene trimers and other unsaturated hydrocarbons containing from 4 to 6 carbon atoms hereinafter mentioned. They are relatively unsaturated as indicated by an iodine number of from about 70 to about 110 when analyzed according to ASTM Method D–1959–61 and have superior color stability and thermal stability when compared to other similarly unsaturated synthetic hydrocarbon resins which have not been hydrogenated.

The synthetic hydrocarbon resins of this invention range in colors such as from about 0.1 to about 4 or even up to about 10 on the Barrett color scale. In this specification the Barrett color of the resin is determined by the Barrett Method Number 54. The Barrett Method Number 54 uses a series of color standards which are referred to in Barrett Method Number 54 and are identified in Barrett Number 106. Descriptions of the Barrett Methods 54 and 106 were obtained from the Barrett Division of Allied Chemical & Dye Corporation, 40 Rector Street, New York, N.Y.

Various thermoplastic polymers can be used for the hot melt of this invention. Preferably they have a melt flow (ASTM Method D–1238–57T) of from about 5 to about 5000 and a viscosity of from about 100 centipoises to about 5000 centipoises at about 350° F. Representative examples of the various thermoplastic polymers are polyethylene having a molecular weight of from about 1500 to about 21,000, isotactic and atactic polypropylene, polybutene, ethylene-propylene copolymers having a propylene content of from about 25 to about 75 mol percent, ethylene-vinyl acetate and ethylene-acrylate.

The hot melt adhesives of this invention can be prepared by blending the synthetic hydrocarbon tackifying resin with the thermoplastic polymer to achieve a substantially homogeneous mixture. For example, they can be blended to form a molten mixture at temperatures of from about 240° F. to about 400° F. depending somewhat upon the melting point of the thermoplastic polymer. If desired, the thermoplastic polymer and/or synthetic hydrocarbon resin can be preheated to their molten state before blending. Other mixing methods normally used for blending such materials can be used if desired. The composition can now be used directly or it can be extruded in various forms for use in appropriate hot melt adhesive applicators. Usually the mixture of the thermoplastic polymer and the tackifying resin contains from about 10 to about 70 percent by weight of the tackifying resin. The hot melt adhesives of this invention have superior color stability and thermal stability. Ease of handling and processing are important considerations in hot melt adhesive systems. A blend of the synthetic resin of this invention with polyethylene where the blend contains about 50 percent by weight of the resin has a ring and ball softening point of about 94° C., a melt temperature of about 240° F. and a melt viscosity of less than 100 centipoises above about 260° F.

It is understood that the various additives normally used with hot melt adhesives can be mixed with the thermoplastic polymer-tackifying resin mixture such as pigments, waxes, plasticizers, oils, fillers, stabilizers, and oxidation inhibitors.

The hot melt adhesive can be applied to various substrates in various thicknesses such as from about 0.5 mil to about 25 mils or thicker. The hot melt adhesives of this invention are particularly useful as adhesives for laminating various types of substrates including, for example, metal foils, paper, coated paper, cardboard, waxed paper and polymeric films such as polyethylene and polypropylene films.

The synthetic tackifying resin used in this invention is prepared by polymerizing a mixture comprising from about 20 to about 75 weight percent of piperylene and from about 80 to about 25 weight percent of 2-methyl-2-butene in the presence of an anhydrous metal halide catalyst. It is usually desired that the mixture to be polymerized comprises from about 35 to about 65 weight percent of piperylene and from about 65 to about 35 weight percent of 2-methyl-2-butene.

Various anhydrous metallic halide catalysts can be used to prepare the synthetic resin. Representative examples of such catalysts are fluorides, chlorides, bromides, and iodides of metals such as aluminum, tin, and boron. Such catalysts include, for example, aluminum chloride, stannic chloride, and boron trifluoride.

In carrying out the polymerization reaction, the hydrocarbon mixture is brought into contact with the anhydrous metal halide catalyst. Generally the catalyst is used in particulate form. Generally, a particle size in the range of from about 5 to about 200 mesh size is used although larger or smaller particles can be used. The amount of catalyst used is not critical although sufficient catalyst must be used to cause a polymerization reaction to occur. The catalyst may be added to the olefinic hydrocarbon mixture or the hydrocarbon mixture may be added to the catalyst. If desired, the catalyst and mixture of hydrocarbons can be added simultaneously or intermittently to a reactor. The reaction can be conducted continuously or by batch process techniques generally known to those skilled in the art.

The reaction is conveniently carried out in the presence of a diluent because it is usually exothermic. However, with adequate mixing and cooling the temperature can be controlled and reaction conducted without a diluent being present. Various diluents which are inert in that they do not enter into the polymerization reaction may be used. Representative examples of inert diluents are aliphatic hydrocarbons such as pentane, hexane, and heptane, aromatic hydrocarbons such as toluene and benzene, and unreacted residual hydrocarbons from the reaction.

A wide range of temperatures can be used for the polymerization reaction in preparing the synthetic resins. The polymerization can be carried out at temperatures in the range of from about −20° C. to about 100° C., although usually the reaction is carried out at a temperature in the range of from about 0° C. to about 50° C. The polymerization reaction pressure is not critical and may be atmospheric or above or below atmospheric pressure. Generally, a satisfactory polymerization can be conducted when the reaction is carried out at about autogenous pressure developed by the reactor under the operating conditions used. The time of the reaction is not generally critical and reaction times can vary from a few seconds to 12 hours or more.

The synthetic resins can be modified by the addition of up to about 50 weight percent of piperylene dimers or piperylene trimers or other unsaturated hydrocarbons, particularly hydrocarbons containing from 4 to 6 carbon atoms, and mixtures thereof to the piperylene/2-methyl-2-butene mixture. Representative examples of such hydrocarbons are butene and substituted butenes such as 2-methyl-1-butene, 2,3-di-methyl-1-butene, 2,3-dimethyl-2-butene, 3,3-dimethyl-1-butene; the pentenes and substituted pentenes such as 1-pentene, 2-pentene, 2-methyl-1-pentene, 2-methyl-2-pentene, 3-methyl-2-pentene, 4-methyl-1-pentene; 4-methyl-2-pentene, the hexenes such as 2-hexene, diolefins such as isoprene, and cyclic unsaturated hydrocarbons such as cyclopentene, cyclohexene and 1,3-cyclopentadiene.

In the practice of this invention it has been taught that various thermoplastic polymers can be used. It is to be understood that some of the various thermoplastic polymers can also have elastomeric properties.

The following examples further illustrate the invention and are not intended to be limiting. In these examples, parts and percentages are by weight unless otherwise indicated.

EXAMPLE 1

A synthetic hydrocarbon resin suitable as a tackifying resin in this invention was prepared by the following method:

In a suitable reactor was placed 50 parts of heptane and 3.08 parts of anhydrous aluminum chloride. The mixture was cooled to about 5° C. While continuously stirring the mixture 200 parts of a hydrocarbon mixture was slowly added to the reactor over a period of about 30 minutes. The hydrocarbon mixture had the following composition:

| Component | Percent |
| --- | --- |
| 2-pentene | 4.8 |
| 2-methyl-2-butene | 42.2 |
| Isoprene | 2.5 |
| 1,3-pentadiene (piperylene) | 42.4 |
| 2,3-dimethyl-1-butene | 2.6 |
| Unsaturated hydrocarbons containing 5 to 6 carbon atoms | 5.5 |
| | 100.0 |

The temperature of the reaction was maintained in a range of about 5° to 10° C. Approximately 100 parts of water was added to the mixture to decompose the aluminum chloride. The mixture was filtered to remove particles of decomposed aluminum chloride. The filtrate separated into an organic layer containing heptane, the polymerization product and unreacted hydrocarbons and a water layer. The water layer was drained from the filtrate. The organic layer was flash distilled by first heating it to 50° C. to remove unreacted hydrocarbons following which the pressure was reduced to about 10 millimeters of mercury pressure absolute and the pot temperature was increased to 290° C. The resulting residual molten resin was poured from the pot onto an aluminum tray and cooled to about 23° C. to form 121 parts of a hard brittle resin having a pale yellow color and a softening point, according to ASTM Method E28–58T of 94° C.

EXAMPLE 2

In a suitable heat jacketed container was charged 40 parts of a synthetic hydrocarbon resin prepared according to the method of Example 1 and 60 parts of a particulate polyethylene. The polyethylene had a molecular weight of about 1500 and was obtained as polyethylene 617A from the Allied Chemical Company. The mixture was blended in its molten state by heating the jacket of the container to about 177° C. A sample of the hot melt was determined to have a ring and ball softening point of about 94° C. according to ASTM Method E28–58T. The viscosity of the hot melt in the container was less than 100 centipoises when measured with a model HBT Brookfield Viscometer at 20 r.p.m. which promoted easy handling.

The hot melt was coated in its tacky molten state at about 115° C. with a number 2 Mayer wire wound rod onto the surface of a paper board substrate and onto the surface of an aluminum foil. The paperboard had a thickness of about 15 mils and was obtained as Marathon 15 point paperboard Spec. No. 1296. While the hot melt adhesive coatings were still in their molten state, a second paperboard was adhered to the coated paperboard surface and a second strip of aluminum foil was adhered to the coated aluminum foil surface to form two separate laminates. The laminates were cooled to about 25° C. and the hot melt adhesive showed good adhesion to the paperboard and to the aluminum foil.

If desired, a small amount of various oils, preferably heat stable oils such as mineral oil or safflower oil, can be mixed with the hot melt in its molten state to increase its flexibility.

While certain representative embodiments and details have been shown for the purpose of illustrating the invention, it will be apparent to those skilled in the art that various changes and modifications may be made therein without departing from the spirit or scope of the invention.

What is claimed is:

1. A hot melt adhesive composition comprising an admixture of at least one thermoplastic polymer and a synthetic hydrocarbon resin having a softening point of from about 80° C. to about 110° C., where the said thermoplastic polymer is selected from polyethylene, polypropylene, polybutene and ethylene-vinyl acetate copolymers and where the said synthetic hydrocarbon resin is present in an amount of from about 10 to about 70 weight percent of the hot melt composition, and comprises from about 40 to about 80 weight percent units derived from 1,3-pentadiene and from about 60 to about 20 percent units derived from 2-methyl-2-butene.

2. A hot melt adhesive composition according to claim 1 where the said thermoplastic polymer is ethylene-vinyl acetate copolymer.

3. A hot melt adhesive composition according to claim 1 where the said thermoplastic polymer is selected from polyethylene having a molecular weight of from about 1500 to about 21,000 and atactic polypropylene.

4. A hot melt adhesive composition according to claim 3 where the synthetic hydrocarbon resin has an iodine number according to ASTM Method D-1959-61 of from about 70 to about 110.

5. The hot melt adhesive composition according to claim 1 wherein the synthetic hydrocarbon resin also contains up to about 25 weight percent units derived from at least one unsaturated hydrocarbon selected from piperylene dimers, piperylene trimers, and other unsaturated hydrocarbons containing from 4 to 6 carbon atoms.

6. The hot melt adhesive composition according to claim 5 where the said thermoplastic polymer is an ethylene-vinyl acetate copolymer, polyethylene having a molecular weight of about 1500 to about 21,000 or atactic polypropylene.

7. The hot melt adhesive composition according to claim 5 where the other unsaturated hydrocarbons are selected from butene, 2-methyl-1-butene, 2,3-dimethyl-1-butene, 2,3-dimethyl-2-butene, 3,3-dimethyl-1-butene, 1-pentene, 2-pentene, 2-methyl-1-pentene, 2-methyl-2-pentene, 3-methyl-2-pentene, 4-methyl-1-pentene and 4-methyl-2-pentene.

References Cited

UNITED STATES PATENTS

| 2,383,839 | 8/1945 | Beekley | 260—897 |
| 2,497,458 | 2/1950 | Kurtz | 260—888 |
| 3,035,013 | 5/1962 | Cull et al. | 260—82 |

MURRAY TILLMAN, Primary Examiner.

M. J. TULLY, Assistant Examiner.

U.S. Cl. X.R.

117—132, 138.8; 156—334; 161—217, 253, 270; 260—33.6, 82, 888, 897